May 6, 1941.  M. L. ALEXANDER  2,240,825
ENGRAVING MACHINE
Filed Dec. 12, 1939  5 Sheets-Sheet 1
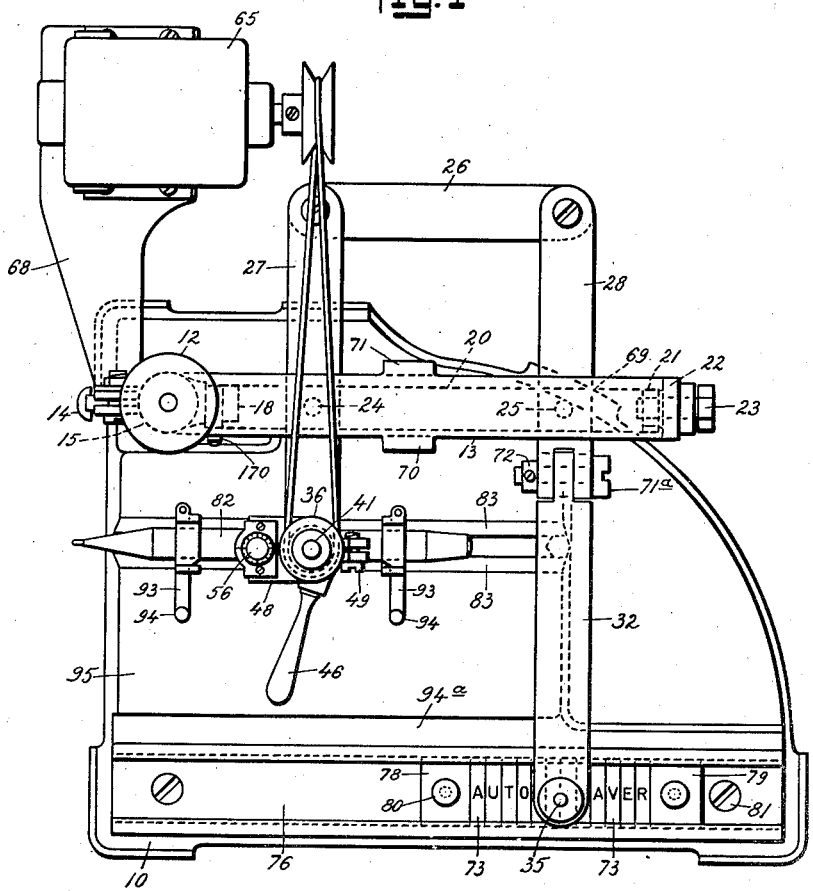
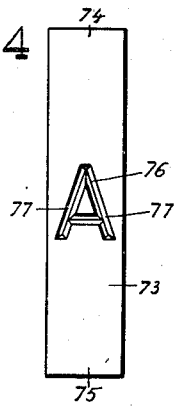
INVENTOR.
MORRIS L. ALEXANDER
BY *Irving Seidman*
ATTORNEY.

May 6, 1941.  M. L. ALEXANDER  2,240,825
ENGRAVING MACHINE
Filed Dec. 12, 1939  5 Sheets-Sheet 3
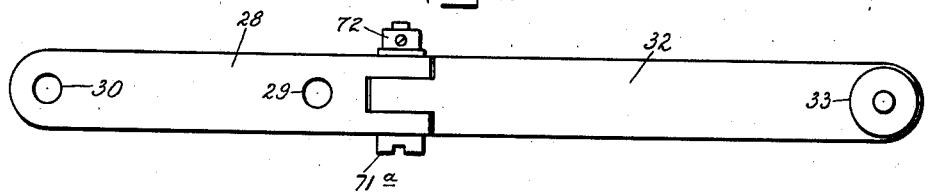
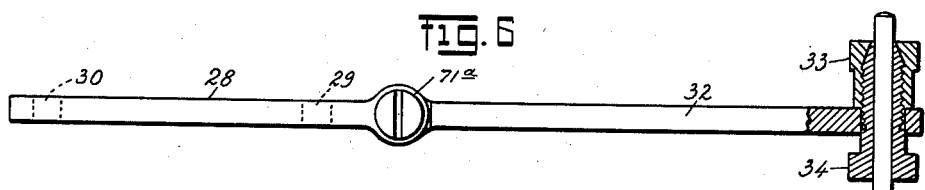
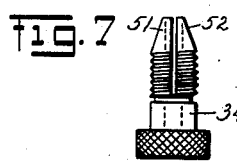
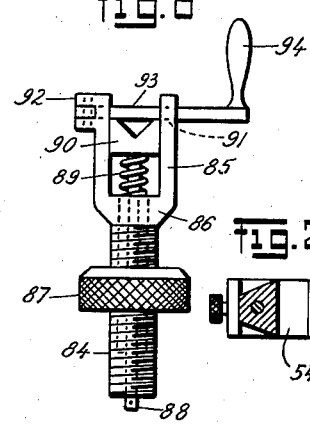
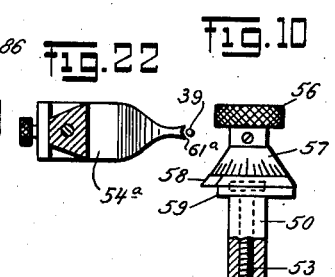
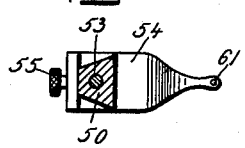
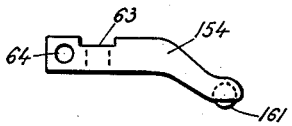
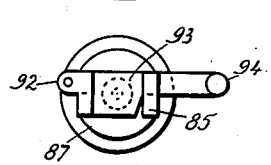
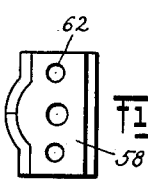
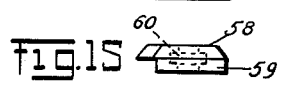
INVENTOR.
MORRIS L. ALEXANDER
BY Irving Seidman
ATTORNEY.

May 6, 1941.  M. L. ALEXANDER  2,240,825
ENGRAVING MACHINE
Filed Dec. 12, 1939   5 Sheets-Sheet 4
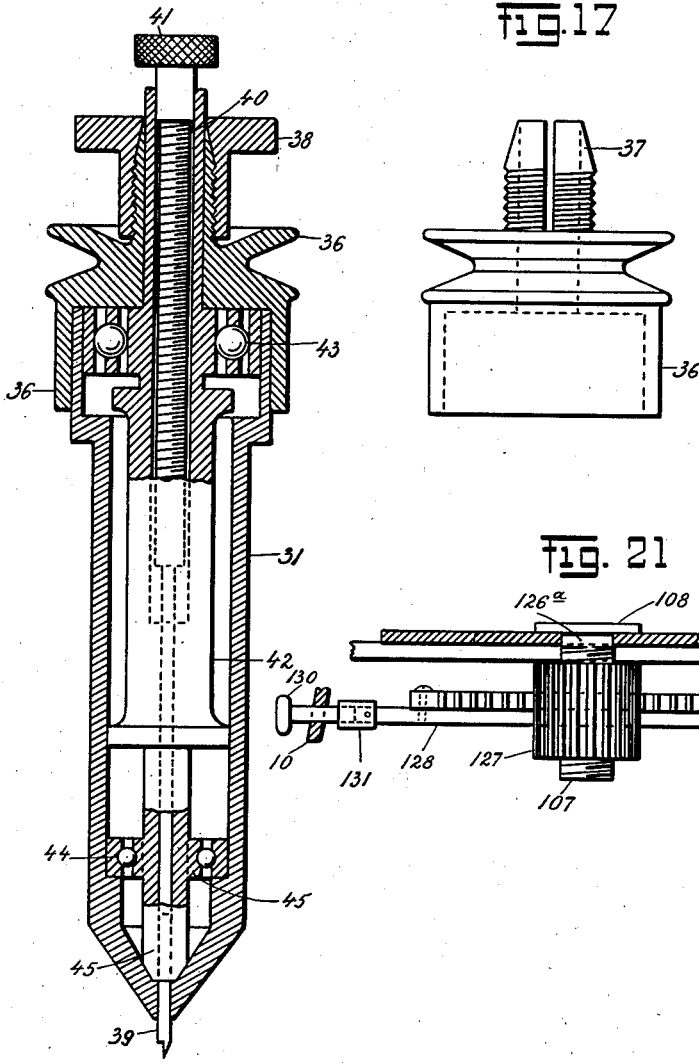
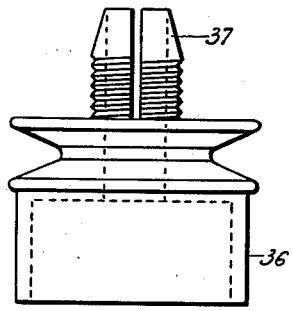
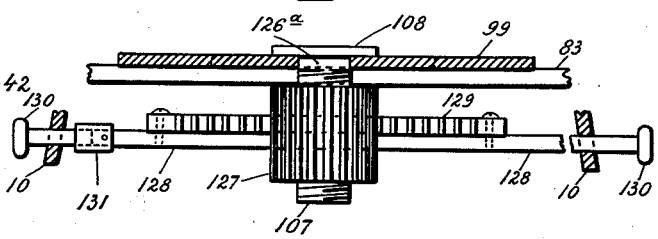
INVENTOR.
MORRIS L. ALEXANDER
BY Irving Seidman
ATTORNEY.

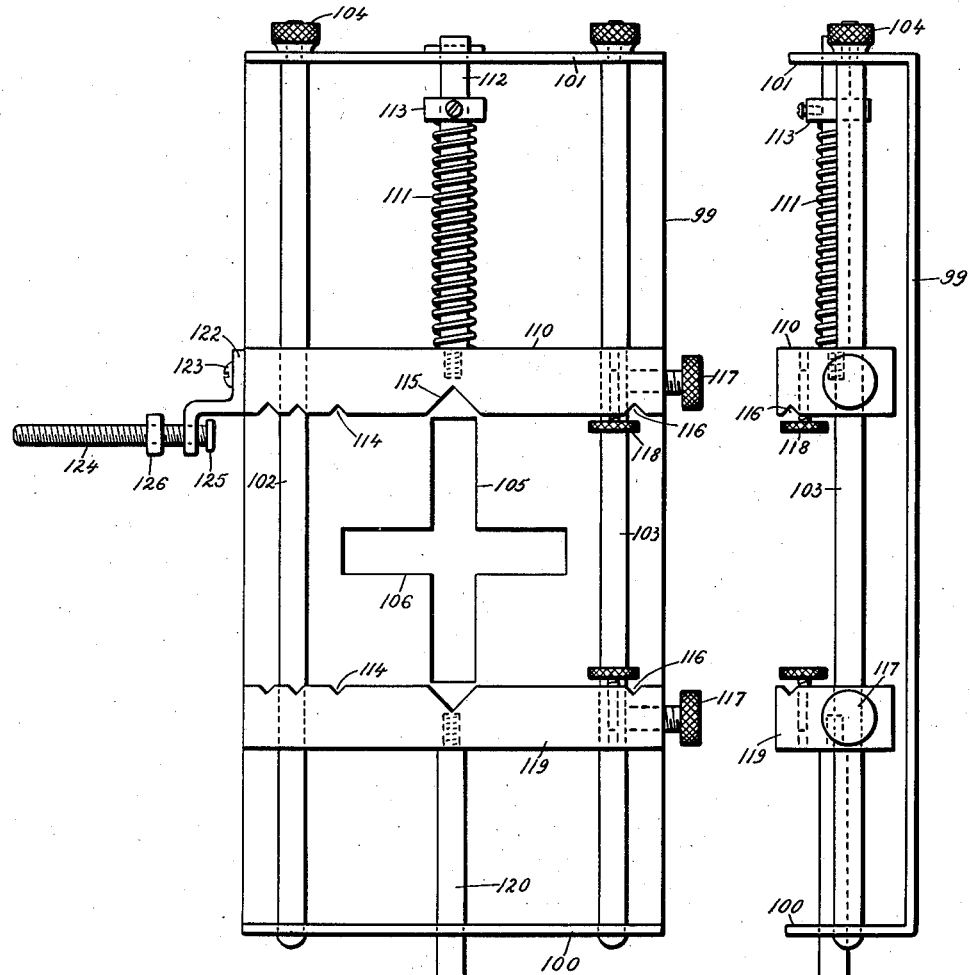
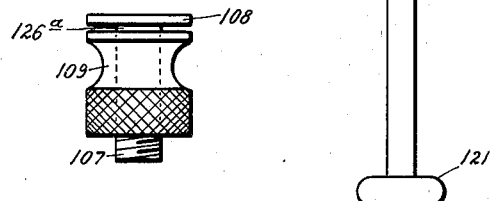

Patented May 6, 1941

2,240,825

UNITED STATES PATENT OFFICE 2,240,825

ENGRAVING MACHINE

Morris L. Alexander, New York, N. Y.

Application December 12, 1939, Serial No. 308,799

9 Claims. (Cl. 90—13.1)

This invention relates generally to machines of the duplicator or copying type in which tracer and cutter elements are movable in substantial unison, and has particular reference to engraving machines.

One of the objects of the invention is the provision of an organization in which the constituent elements are so arranged structurally and functionally as to assure improved results with materials and members which, capable of being manufactured at reasonable cost, are easy to assemble, and which may constantly retain its efficient working qualities.

The machine disclosed, which is conveniently portable, as in a carrying case, and also well adapted to be packed for shipment, is compact, symmetrical and light, and a feature of the invention, securing another of the desired objects, resides in cooperating parts which are exceptionaly easy to manipulate, said parts, as in one portion of the machine being arranged in balanced condition.

The machine comprises a horizontally swingable overarm, which carries opposed pivots or trunnion means. Balanced on and substantially above the pivots, parallel with and below said arm, is a cross bar, whereon pantograph linkage mechanism is also appropriately pivoted and horizontally swingable, thereby rendering the tracer and cutter elements particularly capable of universal movement.

The aforesaid cross bar, elevated with relation to its pivot ends, is accordingly adapted for rockable movement, but this movement is restricted, means being provided on the overarm, to secure yet other objects of the invention, for limiting said movement.

Owing to the fine or precise balancing, a manipulating member or handle forms a part of the organization. The disclosed pattern means, as used with the tracer, said means being however just one pattern example, are shown in the form of characters which are deeply cut; and since the handle has reference to substantial vertical movement of the cutter element, with its associated members, while the sides of the cuts have vertically inclined surface portions, it is seen that the particular balanced movement forms a methodical feature of the disclosure made.

A particular advantage of this balanced structure is that it enables engraving or copying of the pattern on a rounded or curved work piece, since the cutter may be conveniently lowered or elevated, as during the universal horizontal movement.

Another novel feature, as combined with the base of the machine, and in order to secure still a further object of the invention, resides in work holding means, different embodiments of which are disclosed.

The work holding means cooperate closely with novel features in pressure foot structure, and said means, utilizing the base as indicated, includes a sufficiently strong resilient support, below the work, and convenient latch means thereover.

With the above indicated objects and advantages in view, as well as others which will hereinafter appear, the essential features of the present improved construction are herein clearly described, and illustrated in the accompanying drawings, in which:

Fig. 1 is a top plan view of a machine having the present novel characteristics embodied therein.

Fig. 4 is an enlarged top plan view of a character quad or pattern member.

Fig. 5 is a top plan view of a jointed arm of pantograph linkage mechanism.

Fig. 6 is an edge view of said arm.

Fig. 7 is an elevational view of a manipulable member which is shown in section in Fig. 6.

Fig. 8 is a side elevation of a work holding device.

Fig. 9 is a top plan view of the device of Fig. 8.

Fig. 10 is an elevational view of a micrometer device, slide bar, and pressure foot.

Fig. 11 is a horizontal section on the line 11—11, Fig. 10.

Fig. 12 is a side view of a modified form of foot.

Fig. 13 is a top plan view of the showing of Fig. 12.

Fig. 14 is a plan view of a micrometer plate.

Fig. 15 is an end view of the showing of Fig. 14.

Fig. 16 is a vertical central section of a cutter holder, manipulating means therefor, and power driven means.

Fig. 17 is a partial side elevation of the showing of Fig. 16.

Fig. 18 is a plan view of a modified form of work holding means.

Fig. 19 is a side or edge view of the holder of Fig. 18.

Fig. 20 is a side elevation of a retaining bolt, with thumb nut, as used with the holder of Fig. 18.

Fig. 21 is a side elevation, with partial sectional showings, in which another modification of work holder locking means is illustrated.

Fig. 22 is a horizontal section of a modified foot similar to Fig. 11 except with the end removed.

Figure 2:
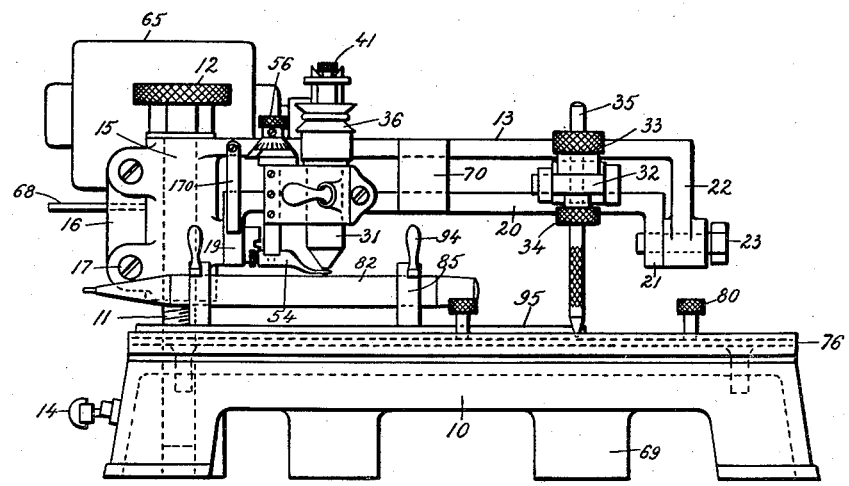
Fig. 2 is a front elevational view of the machine.

In the preferred embodiment of the invention, as selected for illustration, a base 10 has rising therefrom a column or post 11, fast with the top portion of which is a knurled finger piece 12 so that the column, being provided at its lower portion with threads, which cooperate with threads in the base 10, is adjustable vertically for elevating or depressing the same, together with an assembly carried thereby and including an overarm or cross bar 13. At the base portion of the column 11, locking means including a butterfly screw 14 may be used.

The cross arm 13 terminated at one end in a housing 15, having split sections 16, and these sections are so secured together, by bolts 17, as to render said housing with its arm 13 horizontally swingable relative to the post 11.

In a lower boss portion of the housing 15 is a set screw 18 (Fig. 1), on the stem of which an angular vertical end 19 of a carrier bar 20 finds a bearing for limited movement, the opposite end of said bar being formed with an angular terminal 21; and through a boss portion of an angular end 22 of the bar 13 passes a set screw 23, the end of which forms the other bearing or trunnion for the terminal 21, thereby rendering the carrier bar 20 capable of being rocked.

On the carrier bar 20, which is provided with flat sides, being of rectangular cross section, is a pair of pivot elements 24, 25 (Fig. 1), and on these elements, which may be of the nature of bolts, a pantograph linkage mechanism, including a connecting link 26, is pivoted for horizontal swinging movement, there being hingedly connected with said link, arms 27 and 28, the latter being provided with apertures, as 29, Fig. 5, for receiving the pivots 24 and 25.

The hinge connection for respective arms 27 and 28 and interposed link is illustrated in Fig. 1, and in Fig. 5 is shown an example of an aperture 30 for receiving the hinge elements.

On the front end of the arm 27 is mounted a cutter head assembly, which includes a housing 31, and on the front end of the arm 29, having an extension 32, is a stylus assembly including an outer manipulable head element 33, having threads therein, as shown, and a cooperating manipulable member 34 having split sections 51 and 52. The member 34 has thereon threads which cooperate with those of the element 33, whereby to suitably grip the tracer 35.

Revolvable relative to the housing member 31, by a belt driven pulley structure 36, having a threaded split extension 37, is an assembly which includes a manipulable collar 38, the latter having therein threads to cooperate with the threads of said structure. The cutter member 39, below a threaded extension 40, is revolvable with the pulley structure 36, and mounted on the extension 40 is a finger piece 41, so that the cutter, within a barrel member 42 is manually adjustable vertically relative to the housing. Ball bearings 43 are shown between the housing member 31 and relatively revolvable structure 36, as well as bearings 44 between said member and a sleeve 45 of the cutter element 39.

The cutter head 31 has thereon a manipulating member or handle 46, and an extension of said head having portions 47 and 48 opposite a clamping screw 49, provides bearings for a stem 50 of pressure foot mechanism. The screw 49 cooperates with split portions of the head 31, as shown.

The stem 50, having a dovetailed cross section, is adjustable vertically in the bearing 47, 48, there being a threaded rod 53 cooperating with said stem, the latter having at the bottom thereof a removable foot 54, where a retaining screw 55 is provided. Fast with the rod 53, at a finger piece 56, and forming part of a micrometer adjustment, is a cone shaped graduated member 57, below which, resting on the bearing members, is a micrometer plate 58, said plate being adapted to cooperate with the aforesaid graduated member.

Having a second plate 59 below the first plate, as seen in Fig. 15, this arrangement provides means for preventing vertical movement of the rods, a coacting recess 60, shown in broken lines, being effective to form a seat for an annular flange on the rod 53, the flange being so formed as to turnably fit into the recess 60.

Manipulation of the member 56 provides for exceedingly fine adjustment of the foot 54, as seen from the disclosed graduations. This foot has therein an aperture 61, through which the point portion 39 of the rotary cutter passes. Apertures, as 62, are formed in the micrometer plate, whereby to attach the same to the bearings 47, 48.

A modified form of the pressure foot 54 is shown in Figs. 12 and 13, where a foot 154, at a recess 63, is adapted to fit onto the base of the stem 50. The foot 154 is provided with lugs, as shown, in which is an aperture for receiving a fastening element, and this foot instead of an aperture, has in the end thereof a ball bearing 161, for engaging a work piece.

Another modified foot 54ª in Fig. 22 has a shaped end 61ª and which permits the foot to be brought close to the cutter 39.

Figure 3:
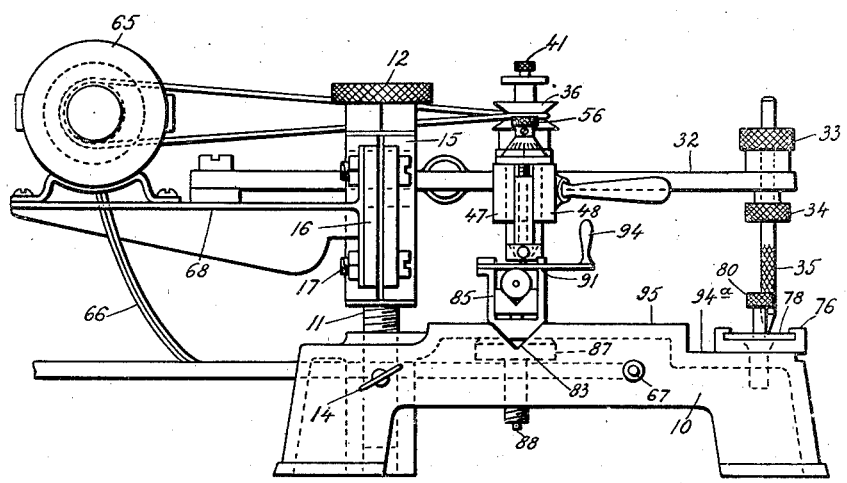
Fig. 3 is a side view, being the left hand side, of the machine of Figs. 1 and 2.

The aforesaid driven pulley of the cutter mechanism cooperates, through a belt, with a drive pulley, all as shown, on the shaft of a motor 65, the latter receiving current from any source, and having, as seen in Fig. 3, leads 66, in connection with switch means 67.

The motor 65 is mounted on a suitable bracket 68. Features of novelty, consistent with strength and lightness, are seen in the base 10, where the latter, although generally rectangular, is formed with a cut-away corner, distant from the usual location of the work piece, and the manner of extending the feet portions of said base, all as shown, and including a foot member 69, at said corner, contribute to the provision of a symmetrical organization having the particular improved features herein specified.

On the cross bar 13 are integral rigid side lugs, which form stops 70, 71 as seen for example in Fig. 1, for the pantograph linkage mechanism, as the latter is rocked substantially vertically, on operation of the handle 46. It is an advantage to have the carrier bar 20 with its mountings, rockable about the axis of the trunnion screws 18, 23, since in this arrangement said bar is normally positioned in balanced condition on the top portion of an arc having its center on said axis. This rocking movement provides for precise control of the cutter point 39 on various adjacent, parallel horizontal planes, during universal movement of said point, as detailed.

With the desired precise balancing of the carrier bar 20 and the means mounted thereon, as described in this disclosure, said bar is resiliently held balanced by a leaf spring 170, the latter being fast with the arm 13 at one end, and having its free end seated against the flat side of said carrier bar.

The extension 32 of the linkage mechanism is hingedly connected with the portion 28 thereof, there being a hinge pin or screw 71ª passed through the barrels of the arms. A nut or retaining collar 72, having a lock screw therein, where a spacing shim, as shown, may also be used, exerts such pressure against the barrel and screw head members as to render the connection rigid, for the purpose of rocking the pantograph assembly against the action of the leaf spring. The portion or extension 32 is swingable relative to the part 28, as for particular adjustment or replacement of a stylus member 35 or tracer.

The member 35, as with the associated detailed structures, provides a guide for the cutter 39, it being seen that quads 73 have characters thereon, as at present selected for disclosure. Except for the particular characters or indicia, such as A or U, the quads 73 are alike. Each quad or character strip, having plain ends 74, 75, slidably fits into place in a holder or channel member 76, the latter being attached on a lower stepped portion 94ª of the base 10 by screws having the illustrated countersunk heads.

In the instant case, the character A, Figs. 1 and 4, is represented as being cut relatively deep in the quad 73, said character having a sunken medial linear portion 76 and inclined sides as 77. Retaining quads 78, 79 are used with the character quads, the quads 78, 79 having retaining screws 80, 81 therein.

The work piece herein selected for illustration is in the form of a cylinder, pen or pencil 82, and another novel feature resides in a work holder for said cylinder. For this purpose the base 10 has in an upper or crown portion 95 thereof a slot, bounded on opposite sides by inclined flanges 83, which are effective to receive the work holders, two of which are illustrated.

A work holder (see Figs. 8 and 9) includes a threaded stem 84, having top legs as 85, which are provided with inclined side portion 86, each alike, for fitting against the flanges 83 of the base 10, the stem 84 being of such diameter as to pass through the slot between said flanges. A thumb nut 87 is effective to clamp the holder to the base, as seen in Fig. 3.

Passing axially through a bore in the stem 84 is a slide rod 88, which has thereon a coiled pressure spring 89, below a V head 90, the latter being adapted to receive therein a cylinder 82.

One leg 85 has at the top thereof a side notch 91, and at the top of the other leg 85 is a pin. The pin passes through ears 92, and on said pin is hingedly mounted one end of a latch bar 93, the other end of which is formed with a handle or finger piece member 94.

On placing an article 82 in the V head 90, and pressing the same down against the action of the spring 89, while the latch is in the open position, said article (Fig. 3) being sufficiently low, the latch 93 is returned to the holding position illustrated.

In Figs. 18, 19, a modified form of work holding means is disclosed, and this device includes a bed plate 99 having end flanges 100, 101, in which rods 102, 103 are secured, by thumb nuts 104, to form a track.

The plate 99 has therein longitudinal and transverse slots 105, 106 respectively, so that said plate may be fastened in a selected position on the top of the base 10, said slots being adapted to cooperate with the slot between the base flanges 83, through the instrumentality of a lock bolt arrangement, Fig. 20.

This bolt has a stem 107, in part like the stem 84, and a thin flat head 108, which is adapted to engage against the top surface of the plate 99, a thumb nut 109 being adapted to clampingly engage against the under face of the top of the base 10.

On the track 102, 103 is mounted a slide bar and holding member 110, there being apertures in the bar to receive the rods of the track. As illustrated, a pressure spring 111 rests in normal inactive position on a rod 112, said rod being suitably terminally retained, as illustrated, in the flange 101. A collar 113 on said rod may be fixed in any suitable position thereon, by means of the screw shown, for determining the pressure to be exerted by the spring.

The slide bar 110, in the present case having vertical V-grooves, as 114, 115, and a horizontal V-groove 116, is also provided with a thumb screw 117, for holding the bar in position on the track.

Another retaining screw 118 may be used, and a second slide bar 119 is in every respect similar to the bar 110, so that a description of one, as indicated by the numerals, is equally applicable to the other.

The V-grooves illustrated are merely specimens of other formations of bar faces, which may be used as equivalents. The bar 119 has thereon a rod or handle 120, on the end of which is a manipulating knob 121.

Any required pressure, consistent with the power of the spring 111, may be used to grip a work piece between the holding bars, it being seen that at the outer end of the rod 112, the fixed collar acts as a stop, where a small portion of the rod 112 may first slide through the flange. When the desired pressure against a work piece is arranged by the bar 119, the screw 117 is grippingly fixed against the track member.

Usually, the members 110, 119 grip the sides of an article to be held and the disclosed device also shows end holding means which includes a clamping element 122. The element 122 is turnably held, as for moving into position opposite the end of an article, by a screw 123, and threadedly mounted in an arm of said element is a work engaging rod 124, having a head 125. The rod 124 may have a lock nut or collar 126 thereon.

A modification of the clamping means shown in Fig. 20, with the base 10 and device of Figs. 18, 19 is illustrated in Fig. 21, where an angular portion 126ª of a stem 107 is likewise held against turning in the plate 99.

In this case, a cylindrical ribbed nut 127 cooperates threadedly with the stem 107. Passing through the walls of the base 10 is a rod 128, which may be of angular or square cross section. The rod 128, which has end finger pieces 130, certain distances from the wall of the base 10, may be jointed as at 131, so as to admit of interior assembly.

On the rod 128, a rack bar 129 is made fast, and the teeth of said bar mesh with the teeth or ribs of the nut 127. As a knob 130 is moved slidable in one direction, the nut 127 is revolved so as to tighten the bolt against the interposed members; and as it is moved in the other direction, said nut is revolved for opening purposes. The plate 99 may accordingly be readily clamped, or released for relative movement thereof.

Variations other than those specified may be resorted to within the scope of the invention and parts of the improvements may be used without others.

I claim:

1. In an engraving machine, a supporting column, an over arm pivotally mounted on said column and having opposed trunnions below the ends thereof, pantograph mechanism including a balanced cross bar having depending vertical ends pivotally mounted on said trunnions, said bar having thereon spaced pivots, horizontally movable linkage mechanism including a rear connecting link member and having arms journalled on said pivots, said arms having on their respective front ends a tracing device and a cutter head, the latter having a cutter element thereon, and a manipulating member carried by and extending from said head.

2. In an engraving machine having a base and supporting column, an overarm mounted for horizontal swinging movement on said column and having opposed trunnions below the ends thereof, pantograph mechanism including a balanced carrier bar having depending vertical ends pivotally mounted on said trunnions, the bar being spaced below said arm parallel therewith; spaced pivots carried by the car, horizontally movable linkage mechanism including a rear link member, arms journalled on said pivots and having their rear ends hingedly connected with the ends of said member, one of said arms being relatively long and having on its front end tracing means, the other arm having on its front end a head assembly including a cutting element, and a manipulating member carried by said head whereby during the horizontal movement the cutter may be raised or depressed.

3. A machine according to claim 2, in which said column is vertically adjustable, and means for locking the column in an adjusted position.

4. In an engraving machine comprising a base having a vertical column thereon, an overarm horizontally swingable on said column and having trunnions therebelow, a carrier bar having vertical depending ends movably mounted on the trunnions, pantograph linkage mechanism pivotally mounted on said bar for horizontal movement, said mechanism including arms having thereon tracer means and a cutter head, the latter having a cutter element therebelow; bearings carried by said head and having a slide member therein, a pressure foot carried by said member, a pressure applying terminal carried by said foot at the cutter element, and manipulable means for sliding said member whereby to move said terminal vertically relative to said element.

5. In an engraving machine comprising a base and having a column rising therefrom, an overarm mounted on said column for horizontal movement and having trunnions therebelow, a rockable carrier bar pivotally mounted on said trunnions and having pivot means thereon, pantograph linkage mechanism pivoted on said means for horizontal movement; said mechanism including an arm having thereon tracer means, an arm having thereon a cutter head, a cutter element carried by the head, said head and its element being movable limitedly vertically on rocking said bar; bearings associated with said head and having a slidable stem therein, a pressure foot carried by said stem and having in the free end thereof an aperture for said element, and means for sliding said stem vertically whereby to move said free end relative to the cutter element.

6. In an engraving machine compressing a base having a column rising therefrom, an overarm arm mounted on said column for horizontal movement and having below the ends thereof trunnions, a rockable carrier bar with its ends journalled on the trunnions and having pivot means thereon; pantograph linkage having arms pivoted on said means for horizontal movement, one of said arms having on its front end a cutter head and cutter element, the latter with said front end having substantial vertical movement; bearings associated with said head and having a slidable stem therein, a pressure foot carried by said stem and having a terminal for engaging a work piece at the cutter element, and manipulable means for sliding said stem whereby to move said terminal relative to the said element.

7. A machine according to claim 6, wherein a micrometer member is provided fast with said bearing, and a graduated member on said stem cooperating with the first member.

8. In an engraving machine comprising pantograph linkage mechanism having an arm with a cutter head on the front end thereof, said head having a cutter element therein, a bearing associated with said head and a slidable stem therein, a pressure foot on said stem, a micrometer having plates fast with said bearing and providing a housing therebetween, said stem having a revolvable rod threaded therein for sliding the same, a finger piece rigid with the rod, and a collar fast with said rod and disposed in said housing whereby to prevent longitudinal axial movement of the rod during the sliding movement.

9. An arrangement according to claim 8 in which one of said plates has a graduation mark, and a micrometer member rigid with said rod at the plates and having other coacting graduation marks thereon.

MORRIS L. ALEXANDER.